US012578092B2

(12) United States Patent
McCaffrey

(10) Patent No.: US 12,578,092 B2
(45) Date of Patent: Mar. 17, 2026

(54) COOLED VARIABLE AREA NOZZLE FOR AN AIRCRAFT ENGINE

(71) Applicant: RTX Corporation, Farmington, CT (US)

(72) Inventor: Michael G. McCaffrey, Windsor, CT (US)

(73) Assignee: RTX Corporation, Farmington, CT (US)

( * ) Notice: Subject to any disclaimer, the term of this patent is extended or adjusted under 35 U.S.C. 154(b) by 3 days.

(21) Appl. No.: 18/411,778

(22) Filed: Jan. 12, 2024

(65) Prior Publication Data

US 2025/0230930 A1     Jul. 17, 2025

(51) Int. Cl.
   *F02K 1/04*        (2006.01)
   *B64D 33/04*      (2006.01)
            (Continued)

(52) U.S. Cl.
   CPC .............. *F23R 3/002* (2013.01); *B64D 33/04* (2013.01); *B64D 33/08* (2013.01); *F02C 7/18* (2013.01); *F02K 1/04* (2013.01); *F02K 1/08* (2013.01); *F02K 1/36* (2013.01); *F02K 1/386* (2013.01); *F02K 1/78* (2013.01); *F02K 1/80* (2013.01); *F02K 1/82* (2013.01); *F02K 1/822* (2013.01); *F02K 1/825* (2013.01); *F23R 3/06* (2013.01); *B64D 33/06* (2013.01); *B64D 33/12* (2013.01); *F02K 1/085* (2013.01); *F02K 1/09* (2013.01); *F02K 1/805* (2013.01); *F05D 2260/20* (2013.01); *F05D 2260/601* (2013.01); *F23R 2900/03044* (2013.01)

(58) Field of Classification Search
   CPC ... F02K 1/08; F02K 1/36; F02K 1/386; F02K 1/825; F02K 1/04; F02K 1/085; F02K 1/09; F02K 1/78; F02K 1/80; F02K 1/805; F02K 1/82; F02K 1/822; F23R 3/002; F23R 3/06; F23R 2900/03044; B64D 33/04; B64D 33/06; B64D 33/08; B64D 33/12; F02C 7/18; F05D 2260/20; F05D 2260/601
   See application file for complete search history.

(56) References Cited

U.S. PATENT DOCUMENTS

| | | | | |
|---|---|---|---|---|
| 3,192,712 A | * | 7/1965 | Nash .......................... | F02K 9/78 239/455 |
| 3,372,876 A | * | 3/1968 | Colville .................... | F02K 1/08 239/265.35 |

(Continued)

*Primary Examiner* — Jason H Duger
(74) *Attorney, Agent, or Firm* — Getz Balich LLC

(57) ABSTRACT

An apparatus is provided for an aircraft engine. This apparatus includes a variable area nozzle. The variable area nozzle includes a nozzle wall, a nozzle sleeve, an actuation system and a flowpath extending axially along an axis through the variable area nozzle and radially between the nozzle wall and the nozzle sleeve. The nozzle sleeve includes a shell, a liner, a cooling cavity and an ejector. The shell extends axially along and circumferentially about the axis. The liner axially overlaps and circumscribes the shell. The cooling cavity is formed by and radially between the shell and the liner. The ejector is arranged at a downstream end of the liner along the flowpath. The ejector fluidly couples the cooling cavity to the flowpath. The actuation system is configured to move the nozzle sleeve axially along the axis relative to the nozzle wall.

20 Claims, 7 Drawing Sheets

(51) Int. Cl.
  B64D 33/08 (2006.01)
  F02C 7/18 (2006.01)
  F02K 1/08 (2006.01)
  F02K 1/09 (2006.01)
  F02K 1/36 (2006.01)
  F02K 1/38 (2006.01)
  F02K 1/78 (2006.01)
  F02K 1/80 (2006.01)
  F02K 1/82 (2006.01)
  F23R 3/00 (2006.01)
  F23R 3/06 (2006.01)
  B64D 33/12 (2006.01)

(56) References Cited

U.S. PATENT DOCUMENTS

| | | | |
|---|---|---|---|
| 4,203,286 A | | 5/1980 | Warburton |
| 4,527,388 A | * | 7/1985 | Wallace, Jr. .............. F02K 1/09 |
| | | | 239/265.33 |
| 5,255,849 A | | 10/1993 | Mayer |
| 6,295,805 B1 | * | 10/2001 | Lackey ..................... F02K 1/36 |
| | | | 239/265.17 |
| 7,757,477 B2 | | 7/2010 | Kehret |
| 12,110,839 B1 | * | 10/2024 | McCaffrey ................ F02K 1/40 |
| 12,152,551 B1 | * | 11/2024 | McCaffrey ................ F02K 1/80 |
| 2015/0369126 A1 | * | 12/2015 | Knöpfel .................... F23R 3/06 |
| | | | 60/39.52 |
| 2022/0120218 A1 | * | 4/2022 | Schelfaut ................. F02C 7/20 |

* cited by examiner

COOLED VARIABLE AREA NOZZLE FOR AN AIRCRAFT ENGINE

BACKGROUND OF THE DISCLOSURE

1. Technical Field

This disclosure relates generally to an aircraft engine and, more particularly, to a variable area nozzle for the aircraft engine.

2. Background Information

An aircraft engine may include a variable area nozzle. Various types and configurations of variable area nozzles are known in the art. While these known variable area nozzles have various benefits, there is still room in the art for improvement.

SUMMARY OF THE DISCLOSURE

According to an aspect of the present disclosure, an apparatus is provided for an aircraft engine. This apparatus includes a variable area nozzle. The variable area nozzle includes a nozzle wall, a nozzle sleeve, an actuation system and a flowpath extending axially along an axis through the variable area nozzle and radially between the nozzle wall and the nozzle sleeve. The nozzle sleeve includes a shell, a liner, a cooling cavity and an ejector. The shell extends axially along and circumferentially about the axis. The liner axially overlaps and circumscribes the shell. The cooling cavity is formed by and radially between the shell and the liner. The ejector is arranged at a downstream end of the liner along the flowpath. The ejector fluidly couples the cooling cavity to the flowpath. The actuation system is configured to move the nozzle sleeve axially along the axis relative to the nozzle wall.

According to another aspect of the present disclosure, another apparatus is provided for an aircraft engine. This apparatus includes a variable area nozzle. The variable area nozzle includes a nozzle wall, a nozzle sleeve, an actuator and a flowpath extending axially along an axis through the variable area nozzle and radially between the nozzle wall and the nozzle sleeve. The nozzle sleeve includes a shell, a liner, an endwall, a cooling cavity and an aperture. The shell extends axially along and circumferentially about the axis. The liner axially overlaps and circumscribes the shell. The endwall extends between and is connected to the shell and the liner at a downstream end of the liner. The cooling cavity extends longitudinally within the nozzle sleeve to the endwall. The cooling cavity is formed by and between the shell and the liner. The aperture extends through the endwall and fluidly couples the cooling cavity to the flowpath. The actuator is operatively coupled to the nozzle sleeve and is configured to move the nozzle sleeve axially along the axis relative to the nozzle wall.

According to still another aspect of the present disclosure, another apparatus is provided for an aircraft engine. This apparatus includes a flowpath, a structure and a fluid source. The structure forms a radial peripheral boundary of the flowpath. The structure includes a shell, a liner, a cooling cavity and an ejector. The liner axially overlaps and circumscribes the shell. The cooling cavity is between and is formed by the shell and the liner. The cooling cavity extends longitudinally within the structure to the ejector. The ejector is arranged at a downstream end of the liner along the flowpath. The ejector fluidly couples the cooling cavity to the flowpath. The fluid source is fluidly coupled to the cooling cavity. The structure is configured to receive cooling air in the cooling cavity from the fluid source at a pressure that is less than a pressure of combustion products flowing in the flowpath along the liner.

The structure may be configured as part of a variable area nozzle.

The radial peripheral boundary of the flowpath may be a radial inner peripheral boundary of the flowpath.

The endwall may be angularly offset from the liner by a first included angle. The endwall may be angularly offset from the shell by a second included angle which is greater than the first included angle.

The liner may be angularly offset from the shell at the endwall by an acute included angle.

The ejector may be configured to direct cooling air from the cooling cavity into the flowpath.

The apparatus may also include a fluid source fluidly coupled to the cooling cavity. The nozzle sleeve may be configured to receive cooling air in the cooling cavity from the fluid source at a pressure that is less than a pressure of combustion products flowing in the flowpath along the nozzle sleeve.

The liner may be non-perforated along the cooling cavity upstream of the ejector.

The ejector may include an ejector wall with an ejector aperture. The ejector wall may extend between and may be connected to the shell and the liner. The ejector aperture may extend through the ejector wall and may fluidly couple the cooling cavity to the flowpath.

A height of the cooling cavity may decrease as the cooling cavity extends longitudinally within the nozzle sleeve to the ejector aperture.

A channel may project into the nozzle sleeve from the flowpath to the ejector wall. The channel may fluidly couple the ejector aperture to the flowpath.

The liner may overlap a portion of the channel and the aperture.

The nozzle sleeve may also include a sleeve wall. The sleeve wall may be or otherwise include the ejector wall and may connect the shell to the liner. The liner and the sleeve wall may collectively form a radial inner peripheral boundary of the flowpath along the nozzle sleeve.

At least a section of the liner that extends to the downstream end of the liner may have a frustoconical geometry.

A radius of an outer side of the nozzle sleeve may decrease as the nozzle sleeve extends, in a downstream direction along the flowpath, axially along the axis to the downstream end of the liner.

The nozzle wall may be an outer nozzle wall. The variable area nozzle may also include an inner nozzle wall extending axially along and circumscribing the axis. The nozzle sleeve may axially overlap and circumscribe the inner nozzle wall. The actuation system may be configured to translate the nozzle sleeve axially along the inner nozzle wall.

The cooling cavity may have a longitudinal length that is equal to or greater than two-thirds of a longitudinal length of the nozzle sleeve along the flowpath.

The variable area nozzle may be configured as a convergent-divergent nozzle.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
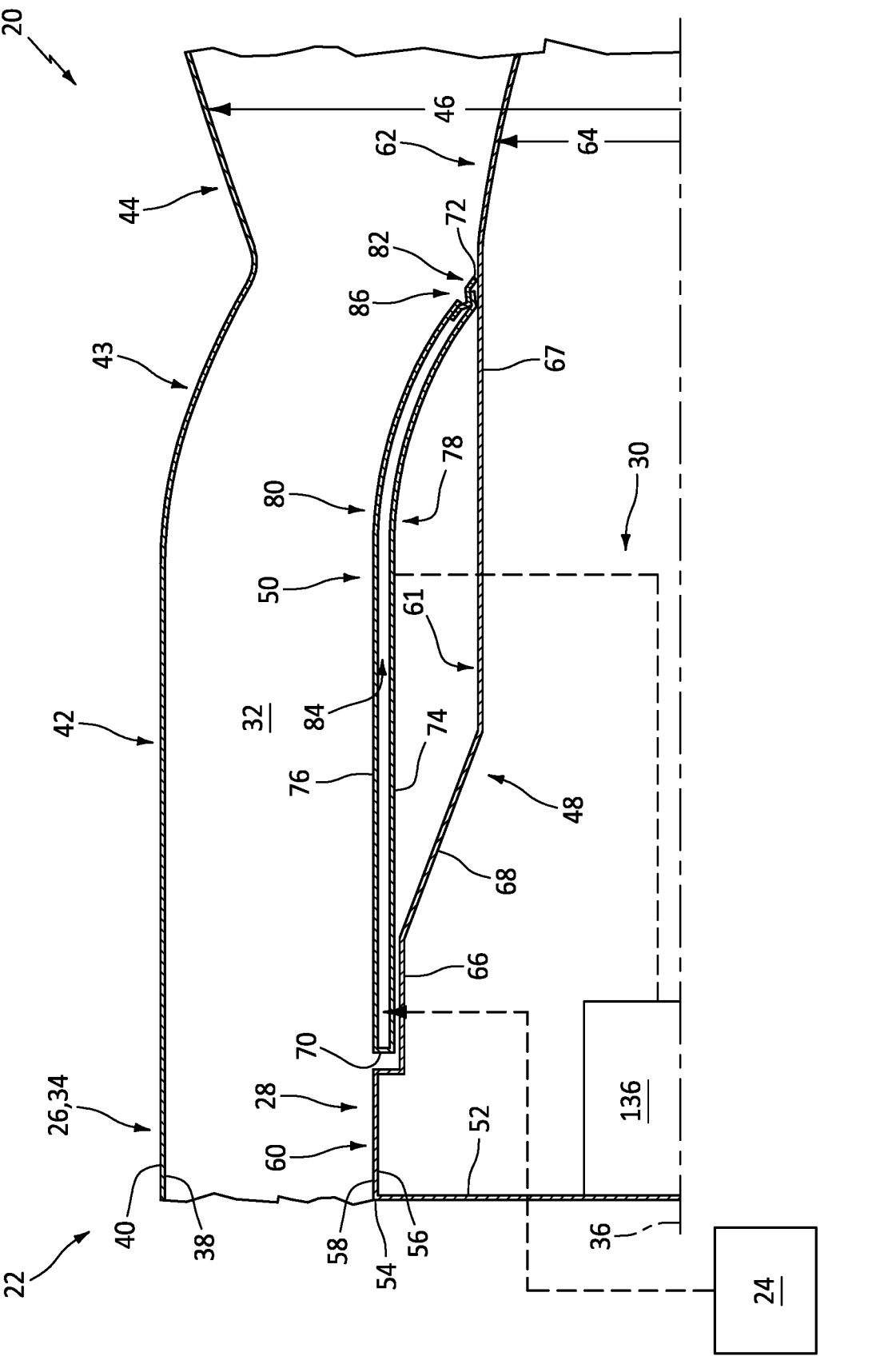
FIG. 1 is a partial side schematic illustration of a nozzle system.

FIG. 1 illustrates a nozzle system 20 for an engine of an aircraft. The aircraft engine may be a gas turbine engine, a pulsejet engine, a rotating detonation engine, a ramjet engine or any other type of suitable combustion engine. This aircraft engine may be configured as, or included as part of, a propulsion system for the aircraft. The aircraft engine may alternatively (or also) be configured as, or included as part of, an electrical power system for the aircraft. The aircraft may be an airplane, a helicopter, a drone (e.g., an unmanned aerial vehicle (UAV)) or any other manned or unmanned aerial vehicle or system. The nozzle system 20 includes a (e.g., convergent-divergent) variable area nozzle 22 and a cooling air source 24. The variable area nozzle 22 includes a nozzle outer structure 26, a nozzle inner structure 28, an actuation system 30 and a flowpath 32; e.g., a core flowpath of the aircraft engine.

The outer structure 26 may be configured as or otherwise include an outer nozzle wall 34; e.g., a tubular flowpath wall. This outer nozzle wall 34 extends axially along an axis 36 from a forward, upstream end of the outer nozzle wall 34 to an aft, downstream end of the outer nozzle wall 34, which outer nozzle wall ends are not visible in FIG. 1. Briefly, the axis 36 may be a centerline axis of the variable area nozzle 22 and/or one or more of its members 26, 28, 30 and 32. The axis 36 may also or alternatively be a rotational axis of one or more rotating structures within the aircraft engine. The outer nozzle wall 34 extends circumferentially about (e.g., completely around) the axis 36, which may provide the outer nozzle wall 34 with a full-hoop (e.g., tubular) geometry. The outer nozzle wall 34 extends radially between and to a radial inner side 38 of the outer structure 26 and its outer nozzle wall 34 and a radial outer side 40 of the outer nozzle wall 34.

The outer nozzle wall 34 of FIG. 1 is configured with one or more wall sections 42-44. The upstream wall section 42 may extend axially from the upstream end of the outer nozzle wall 34 to the intermediate wall section 43. This upstream wall section 42 of FIG. 1 has a (e.g., regular) cylindrical geometry. The intermediate wall section 43 extends axially between and is connected to the upstream wall section 42 and the downstream wall section 44. This intermediate wall section 43 of FIG. 1 has a (e.g., curved) frustoconical geometry and may form a convergent section of the outer structure 26 and its outer nozzle wall 34. A radius 46 from the axis 36 to the outer wall inner side 38, for example, decreases as the intermediate wall section 43 extends axially along the axis 36 from (or about) the upstream wall section 42 to (or about) the downstream wall section 44. The downstream wall section 44 may extend axially from the intermediate wall section 43 to the downstream end of the outer nozzle wall 34. This downstream wall section 44 of FIG. 1 has a (e.g., curved) frustoconical geometry and may form a divergent section of the outer structure 26 and its outer nozzle wall 34. The radius 46 from the axis 36 to the outer wall inner side 38, for example, increases as the downstream wall section 44 extends axially along the axis 36 from (or about) the intermediate wall section 43 to (or towards) the downstream end of the outer nozzle wall 34. The present disclosure, however, is not limited to such an exemplary outer nozzle wall arrangement. For example, the outer nozzle wall 34 may omit the downstream wall section 44 and, thus, may omit the divergent section of the outer structure 26 and its outer nozzle wall 34. In addition or alternatively, the upstream wall section 42 may be configured as an upstream extension of the intermediate wall section 43 and, thus, the convergent section of the outer structure 26 and its outer nozzle wall 34.

The outer structure 26 and its outer nozzle wall 34 are spaced radially outboard from the inner structure 28 and its members (e.g., 48 and 50) by the flowpath 32. The outer structure 26 and its outer nozzle wall 34 also extend axially along (e.g., axially overlap) and extend circumferentially about (e.g., circumscribe) the inner structure 28 and its members (e.g., 48 and 50). With this arrangement, the outer structure 26 and its outer nozzle wall 34 may form a radial outer peripheral boundary of the flowpath 32 axially through the variable area nozzle 22.

The inner structure 28 of FIG. 1 includes the inner nozzle wall 48 (e.g., a sleeve support wall) and the translating nozzle sleeve 50. The inner structure 28 of FIG. 1 also includes an actuator mount 52.

The inner nozzle wall 48 extends axially along the axis 36 from a forward, upstream end 54 of the inner nozzle wall 48 to an aft, downstream end of the inner nozzle wall 48, which inner nozzle wall downstream end is not visible in FIG. 1. The inner nozzle wall 48 extends circumferentially about (e.g., completely around) the axis 36, which may provide the inner nozzle wall 48 with a full-hoop (e.g., tubular) geometry. The inner nozzle wall 48 extends radially between and to a radial inner side 56 of the inner nozzle wall 48 and a radial outer side 58 of the inner nozzle wall 48.

The inner nozzle wall 48 of FIG. 1 is configured with one or more wall sections 60-62. The upstream wall section 60 extends from the upstream end 54 of the inner nozzle wall 48 to the intermediate wall section 61. This upstream wall section 60 of FIG. 1 has a (e.g., regular) cylindrical geometry. The intermediate wall section 61 extends axially between and is connected to the upstream wall section 60 and the downstream wall section 62. The downstream wall section 62 may extend axially from the intermediate wall section 61 to the downstream end of the inner nozzle wall 48. This downstream wall section 62 of FIG. 1 has a (e.g., curved) frustoconical geometry and may form a divergent section of the inner structure 28 and its inner nozzle wall 48. A radius 64 from the axis 36 to the inner wall outer side 58, for example, decreases as the downstream wall section 62 extends axially along the axis 36 from (or about) the intermediate wall section 61 to (or towards) the downstream end of the inner nozzle wall 48.

The intermediate wall section 61 of FIG. 1 includes an upstream land 66, a downstream land 67 and a transition 68. The upstream land 66 is connected to the upstream wall section 60, and the upstream land 66 is disposed axially adjacent and aft, downstream of the upstream wall section 60. This upstream land 66 of FIG. 1 is (e.g., slightly) radially recessed inward (radially towards the axis 36) from the upstream wall section 60. The upstream land 66 may have a (e.g., regular) cylindrical geometry. The downstream land 67 is connected to the downstream wall section 62, and the downstream land 67 is disposed axially adjacent and forward, upstream of the downstream wall section 62. This downstream land 67 of FIG. 1 is radially recessed inward (radially towards the axis 36) from the upstream land 66. The transition 68 extends axially between and is connected to the upstream land 66 and the downstream land 67. This transition 68 has a frustoconical geometry and radially tapers from the upstream land 66 to the downstream land 67. The radius 64 from the axis 36 to the inner wall outer side 58, for example, decreases as the intermediate wall section 61 and its transition 68 extend axially along the axis 36 from (or about) the upstream land 66 to (or towards) the downstream land 67. The present disclosure, however, is not limited to such an exemplary inner nozzle wall arrangement. For example, the upstream wall section 60 may be omitted and the upstream land 66 may be disposed at the upstream end 54 of the inner nozzle wall 48.

The nozzle sleeve 50 extends axially along the axis 36 from a forward, upstream end 70 of the nozzle sleeve 50 to an aft, downstream end 72 of the nozzle sleeve 50. The nozzle sleeve 50 extends circumferentially about (e.g., completely around) the axis 36, which may provide the nozzle sleeve 50 with a full-hoop (e.g., tubular) geometry. The nozzle sleeve 50 extends radially between and to a radial inner side 74 of the nozzle sleeve 50 and a radial outer side 76 of the nozzle sleeve 50. The nozzle sleeve 50 of FIG. 1 includes a sleeve shell 78, a sleeve liner 80, a sleeve wall 82, a cooling cavity 84 and a vacuum ejector 86.

Figure 2:
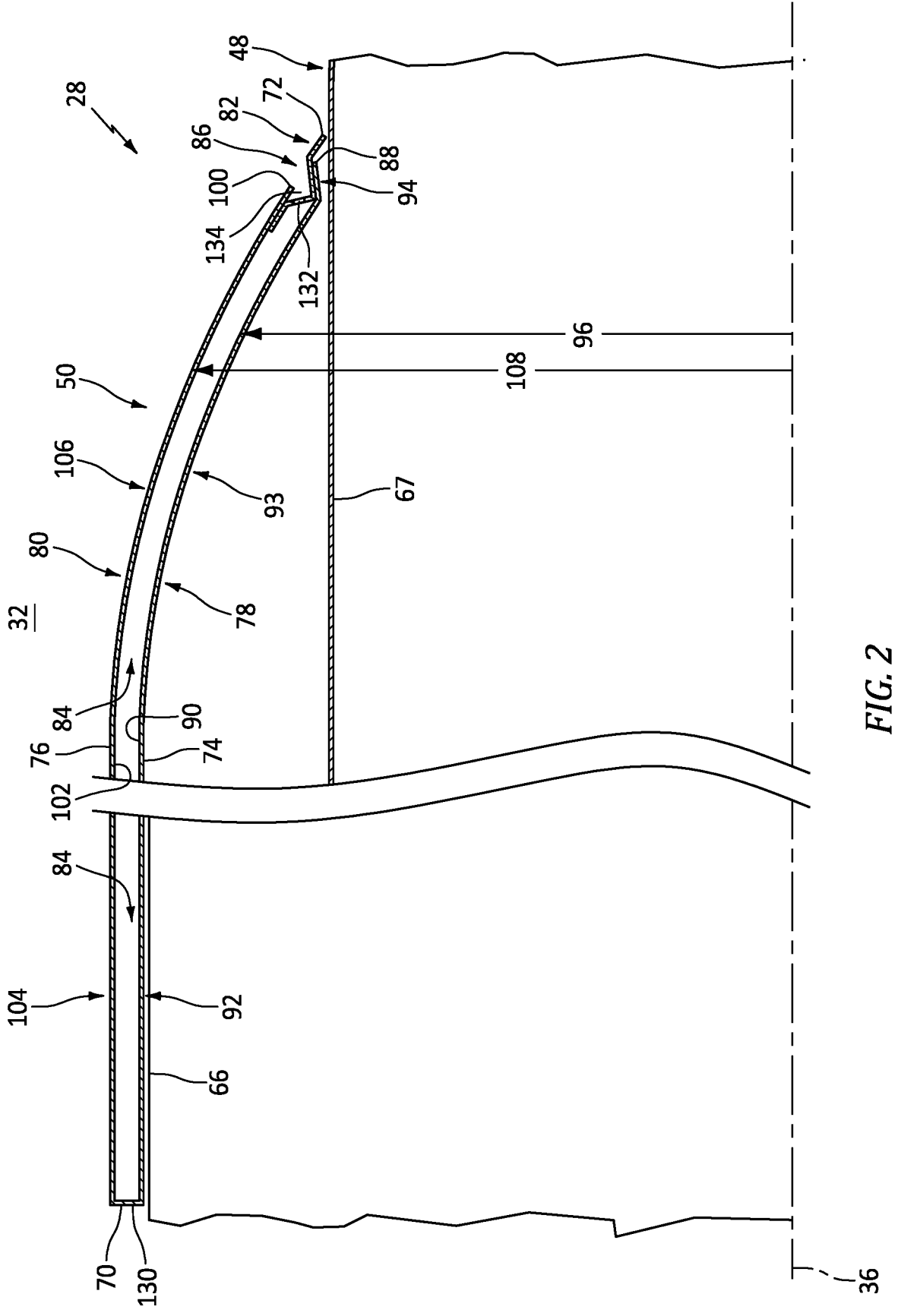
FIG. 2 is a partial side sectional illustration of a nozzle inner structure of a variable area nozzle.

Referring to FIG. 2, the sleeve shell 78 extends axially along the axis 36 from (or about) the sleeve upstream end 70 to an aft, downstream end 88 of the sleeve shell 78. Here, the shell downstream end 88 is axially recessed (forward, upstream) of the sleeve downstream end 72. The sleeve shell 78 extends circumferentially about (e.g., completely around) the axis 36, which may provide the sleeve shell 78 with a full-hoop (e.g., tubular) geometry. The sleeve shell 78 extends radially between and to the sleeve inner side 74 and a radial outer side 90 of the sleeve shell 78. This shell outer side 90 may form a radial inner peripheral boundary of the cooling cavity 84 within the nozzle sleeve 50.

Figure 3:
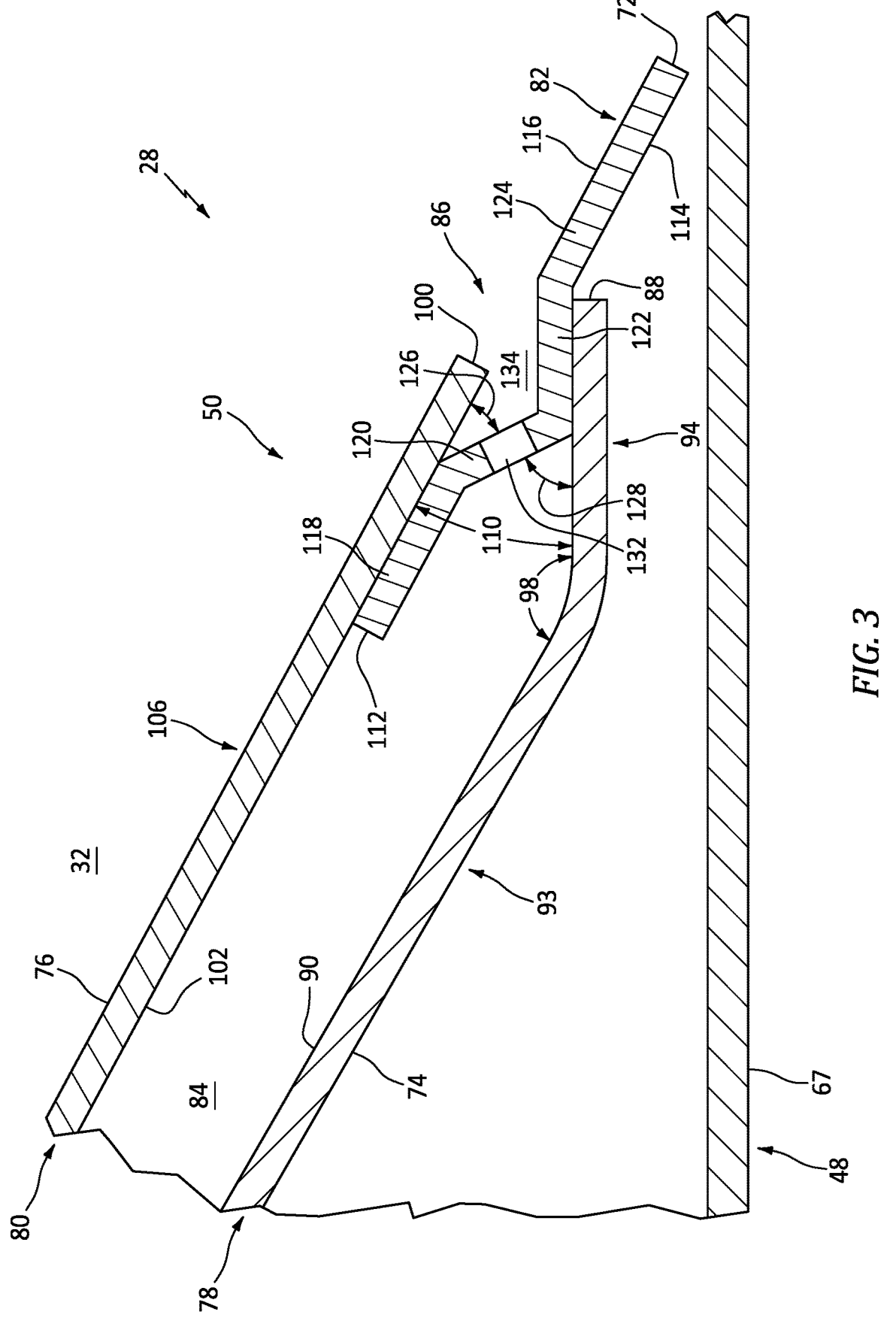
FIG. 3 is a partial side sectional illustration of the nozzle inner structure at a vacuum ejector.

The sleeve shell 78 of FIG. 2 is configured with one or more shell sections 92-94. The upstream shell section 92 extends from the sleeve upstream end 70 to the intermediate shell section 93. This upstream shell section 92 of FIG. 2 as a (e.g., regular) cylindrical geometry. The intermediate shell section 93 extends between and is connected to the upstream shell section 92 and the downstream shell section 94. This intermediate shell section 93 of FIG. 2 has a (e.g., curved) frustoconical geometry and radially tapers from (or about) the upstream shell section 92 to (or towards) the downstream shell section 94. A radius 96 from the axis 36 to the shell outer side 90, for example, decreases as the intermediate shell section 93 extends axially along the axis 36 from (or about) the upstream shell section 92 to (or towards) the downstream shell section 94. Referring to FIG. 3, the downstream shell section 94 extends from the sleeve downstream end 72 to the intermediate shell section 93. This downstream shell section 94 of FIG. 3 may have a (e.g., regular) cylindrical geometry, or alternatively a frustoconical or otherwise convergent or divergent geometry. At an intersection between the intermediate shell section 93 and the downstream shell section 94, the downstream shell section 94 may be angularly offset from the intermediate shell section 93 by an included angle 98. This included angle 98 may be an obtuse angle such as, but not limited to, between one-hundred and thirty degrees (130°) and one-hundred and seventy-five degrees (175°); e.g., about one-hundred and sixty-five degrees (165°).

Referring to FIG. 2, the sleeve liner 80 extends axially along the axis 36 from (or about) the sleeve upstream end 70 to an aft, downstream end 100 of the sleeve liner 80. Here, the liner downstream end 100 is axially recessed (forward, upstream) of the sleeve downstream end 72. The liner downstream end 100 may also be axially recessed (forward, upstream) of the shell downstream end 88. The sleeve liner 80 extends circumferentially about (e.g., completely around) the axis 36, which may provide the sleeve liner 80 with a full-hoop (e.g., tubular) geometry. The sleeve liner 80 extends radially between and to a radial inner side 102 of the sleeve liner 80 and the sleeve outer side 76. This liner inner side 102 may form a radial outer peripheral boundary of the cooling cavity 84 within the nozzle sleeve 50.

The sleeve liner 80 of FIG. 2 is configured with one or more liner sections 104 and 106. The upstream liner section 104 extends from the sleeve upstream end 70 to the downstream liner section 106. This upstream liner section 104 of FIG. 2 as a (e.g., regular) cylindrical geometry. The upstream liner section 104 may be substantially or exactly parallel with the upstream shell section 92, where the upstream shell section 92 substantially follows a contour of the upstream liner section 104. The downstream liner section 106 is connected to the upstream liner section 104. The downstream liner section 106 extends from the liner downstream end 100 to the upstream liner section 104. This downstream liner section 106 of FIG. 2 has a (e.g., curved) frustoconical geometry and radially tapers from (or about) the upstream liner section 104 to (or towards) the liner downstream end 100. A radius 108 from the axis 36 to the sleeve outer side 76, for example, decreases as the downstream liner section 106 extends axially along the axis 36 from (or about) the upstream liner section 104 to (or towards) the liner downstream end 100. The downstream liner section 106 may be substantially or exactly parallel with the intermediate shell section 93, where the intermediate shell section 93 substantially follows a contour of the downstream liner section 106. Referring to FIG. 3, proximate the sleeve downstream end 72, the downstream liner section 106 is angularly offset from the downstream shell section 94 by an included angle 110. This included angle 110 may be a non-zero acute angle such as, but not limited to, between ten degrees (10°) and fifty degrees (50°); e.g., about thirty degrees (30°).

Referring to FIG. 3, the sleeve wall 82 extends axially along the axis 36 from a forward, upstream end 112 of the sleeve wall 82 to the sleeve downstream end 72. The sleeve wall 82 extends circumferentially about (e.g., completely around) the axis 36, which may provide the sleeve wall 82 with a full-hoop (e.g., tubular) geometry. The sleeve wall 82 extends radially between and to a radial inner side 114 of the sleeve wall 82 and a radial outer side 116 of the sleeve wall 82. This wall outer side 116 may be (e.g., slightly) offset from the sleeve outer side 76, or alternatively the wall outer side 116 may be aligned with the sleeve outer side 76.

The sleeve wall 82 of FIG. 3 is configured with one or more wall sections. These wall sections of FIG. 3 include a liner mount 118, a cooling cavity endwall 120 (e.g., an ejector wall), a shell mount 122 and a sleeve tip 124.

The liner mount 118 projects out from a radial outer end of the cavity endwall 120 to the wall upstream end 112. This liner mount 118 may be abutted against the sleeve liner 80 and its downstream liner section 106. The liner mount 118 is connected (e.g., bonded and/or mechanically fastened) to the sleeve liner 80 and its downstream liner section 106 at (e.g., on, adjacent or proximate) the liner downstream end 100.

The cavity endwall 120 extends (e.g., radially and/or axially) between the sleeve liner 80 and the sleeve shell 78. This cavity endwall 120 is angularly offset from the sleeve liner 80 and its downstream liner section 106 by an included angle 126. This included angle 126 may be a non-zero acute angle, a right angle or an obtuse angle such as, but not limited to, between ten degrees (10°) and ninety-five degrees (95°); e.g., about forty-five degrees (45°). The cavity endwall 120 is also angularly offset from the sleeve shell 78 and its downstream shell section 94 by an included angle 128. This included angle 128 may be a non-zero acute angle, a right angle or an obtuse angle such as, but not limited to, between sixty degrees (60°) and one-hundred and five degrees (105°); e.g., about seventy-five degrees (75°). Here, the included angle 128 is different (e.g., greater) than the included angle 126; however, the present disclosure is not limited to such an exemplary geometric relationship.

Figure 4:
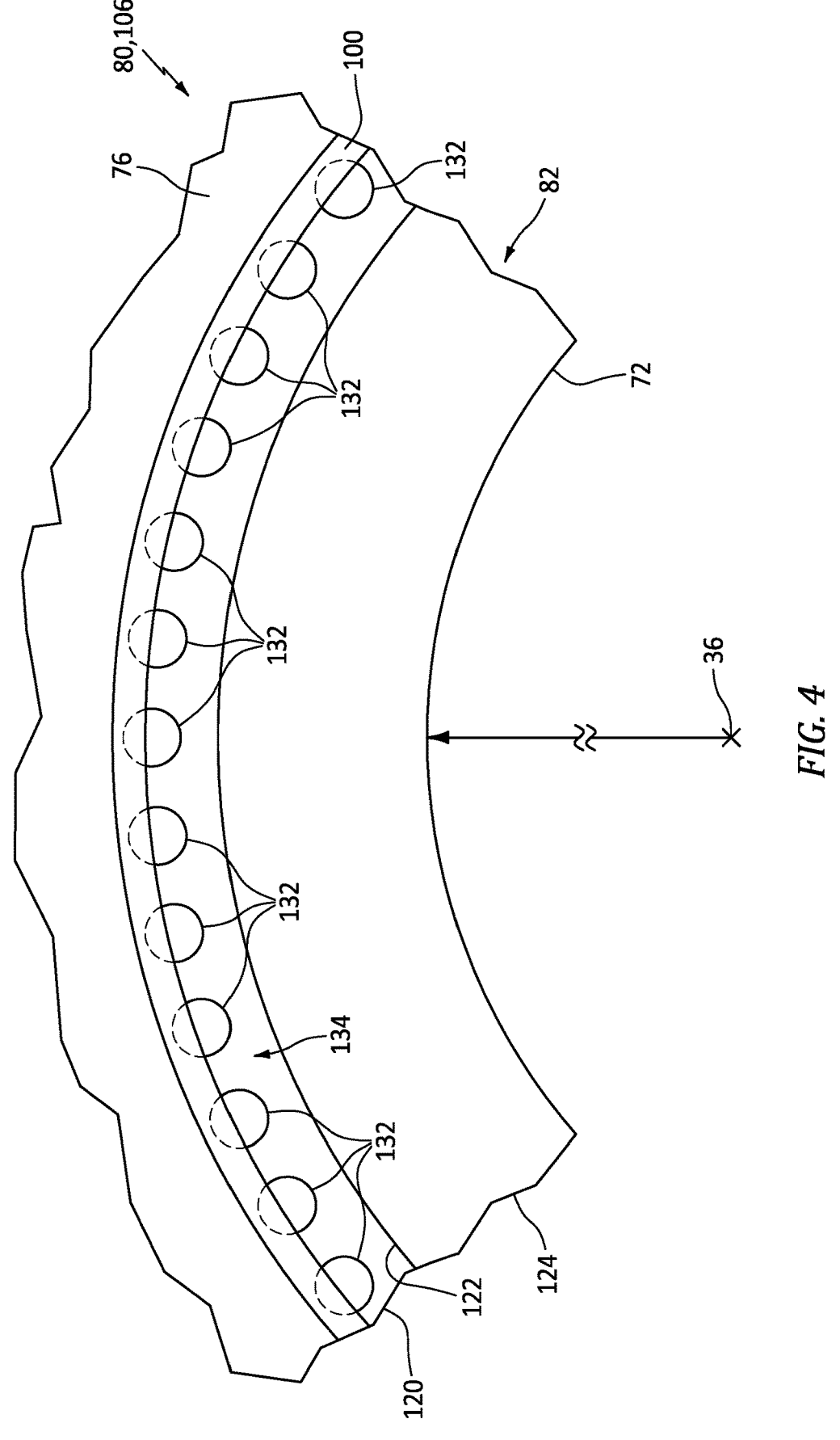
FIG. 4 is a partial end view illustration of a nozzle sleeve at the vacuum ejector.

The cavity endwall 120 may form a distal end of the cooling cavity 84 within the nozzle sleeve 50. The cooling cavity 84 of FIG. 2, for example, extends longitudinally within the nozzle sleeve 50 (and along the shell outer side 90 and the liner inner side 102) from an upstream endwall 130 at (or about) the sleeve upstream end 70 to the cavity endwall 120. Proximate the cavity endwall 120 of FIG. 3, a height (e.g., a radial dimension or a dimension perpendicular to the downstream liner section 106) of the cooling cavity 84 may decrease (e.g., taper) as the cooling cavity 84 extends to the cavity endwall 120. With this arrangement, the cooling cavity 84 of FIG. 2 may have a longitudinal length (e.g., from the upstream endwall 130 to the cavity endwall 120) that is equal to or greater than two-thirds, three-quarters or four-fifths of a longitudinal length of the nozzle sleeve 50. Referring to FIG. 4, the cavity endwall 120 also includes one or more ejector apertures 132 (e.g., holes, slots, etc.) arranged circumferentially about the axis 36 in an array; e.g., a circular array. Referring to FIG. 3, each of these apertures 132 extends through the sleeve wall 82 and its cavity endwall 120.

The shell mount 122 projects out from a radial inner end of the cavity endwall 120 to a radial outer end of the sleeve tip 124. This shell mount 122 may be abutted against the sleeve shell 78 and its downstream shell section 94. The shell mount 122 is connected (e.g., bonded and/or mechanically fastened) to the sleeve shell 78 and its downstream shell section 94 at the shell downstream end 88. The sleeve wall 82 thereby connects the sleeve liner 80 and its downstream liner section 106 to the sleeve shell 78 and its downstream shell section 94.

The sleeve tip 124 projects out from the shell mount 122 to the sleeve downstream end 72. This sleeve tip 124 may be configured as a longitudinal extension of the sleeve liner 80 to the sleeve downstream end 72. The sleeve tip 124 of FIG. 3, for example, may be substantially or exactly parallel with the sleeve liner 80 and its downstream liner section 106.

With the foregoing arrangement, the sleeve wall 82 of FIG. 3 forms a channel 134 (e.g., an annular channel) in the nozzle sleeve 50; see also FIG. 4. This channel 134 projects radially into the nozzle sleeve 50 from the flowpath 32 to the shell mount 122. The channel 134 projects axially into the nozzle sleeve 50 from the flowpath 32 to the cavity endwall 120. The channel 134 extends within the nozzle sleeve 50 and its sleeve wall 82 between and to the cavity endwall 120 and the shell mount 122. Here, an upstream, radial outer portion of the channel 134 is longitudinally covered by a portion of the sleeve liner 80 and its downstream liner section 106 at the liner downstream end 100. This portion of the sleeve liner 80 and its downstream liner section 106 may also longitudinally (e.g., axially and/or radially in FIG. 3) overlap each of the apertures 132. The apertures 132 fluidly couple the cooling cavity 84 to the channel 134, and the channel 134 fluidly couples the apertures 132 to the flowpath 32. The foregoing combination of sleeve members (e.g., 106, 120, 122, 124, 132 and/or 134) may thereby collectively form the vacuum ejector 86 at (or about) the liner downstream end 100/the sleeve downstream end 72. The nozzle sleeve 50, however, may alternatively be configured with various other vacuum ejector arrangements.

Referring to FIG. 1, the nozzle sleeve 50 is disposed radially outboard of the inner nozzle wall 48 and its intermediate wall section 61. The nozzle sleeve 50 also extends axially along (e.g., axially overlaps) and extends circumferentially about (e.g., circumscribes) the inner nozzle wall 48 and its intermediate wall section 61. A portion of the nozzle sleeve 50 of FIG. 2 at the sleeve upstream end 70 is arranged radially next to (e.g., adjacent) the upstream land 66. Here, the upstream shell section 92 may radially engage (e.g., contact, abut against, etc.) and may be moveable (e.g., slidable) along the upstream land 66. A portion of the nozzle sleeve 50 of FIG. 3 at the sleeve downstream end 72 is arranged radially next to the downstream land 67. In some embodiments, the sleeve tip 124 at the sleeve downstream end 72 may be (e.g., slightly) spaced radially outward from downstream land 67 by a gap; e.g., an annular gap. In other embodiments, the sleeve tip 124 at the sleeve downstream end 72 may radially engage the downstream land 67. With the foregoing arrangements, the inner structure 28 forms a radial inner peripheral boundary of the flowpath 32 axially through the variable area nozzle 22. More particularly, the inner nozzle wall 48 and the nozzle sleeve 50 (e.g., the sleeve liner 80 and the sleeve tip 124) collectively form the radial inner peripheral boundary of the flowpath 32 axially through the variable area nozzle 22.

Referring to FIG. 1, the actuator mount 52 is configured to provide a mount for attaching the actuation system 30 to the inner structure 28. The actuator mount 52 of FIG. 1, for example, is configured as a bulkhead and/or a frame connected to (e.g., formed integral with or otherwise attached to) the inner nozzle wall 48 at the upstream end 54 of the inner nozzle wall 48. This actuator mount 52 of FIG. 1 projects radially inward from the inner nozzle wall 48 to (or towards) the axis 36.

The actuation system 30 of FIG. 1 includes an actuator 136 which is operatively coupled to the nozzle sleeve 50. The actuator 136 may be configured as a linear actuator. Examples of the linear actuator include, but are not limited to, a jackscrew and a fluid (e.g., hydraulic) piston. The actuator 136 of FIG. 1 is disposed radially within an interior volume of the inner structure 28 and its inner nozzle wall 48. More particularly, the actuator 136 is located radially inboard of the inner structure 28 and its inner nozzle wall 48. The actuator 136, for example, may be arranged coaxial with the axis 36.

Figure 5A:
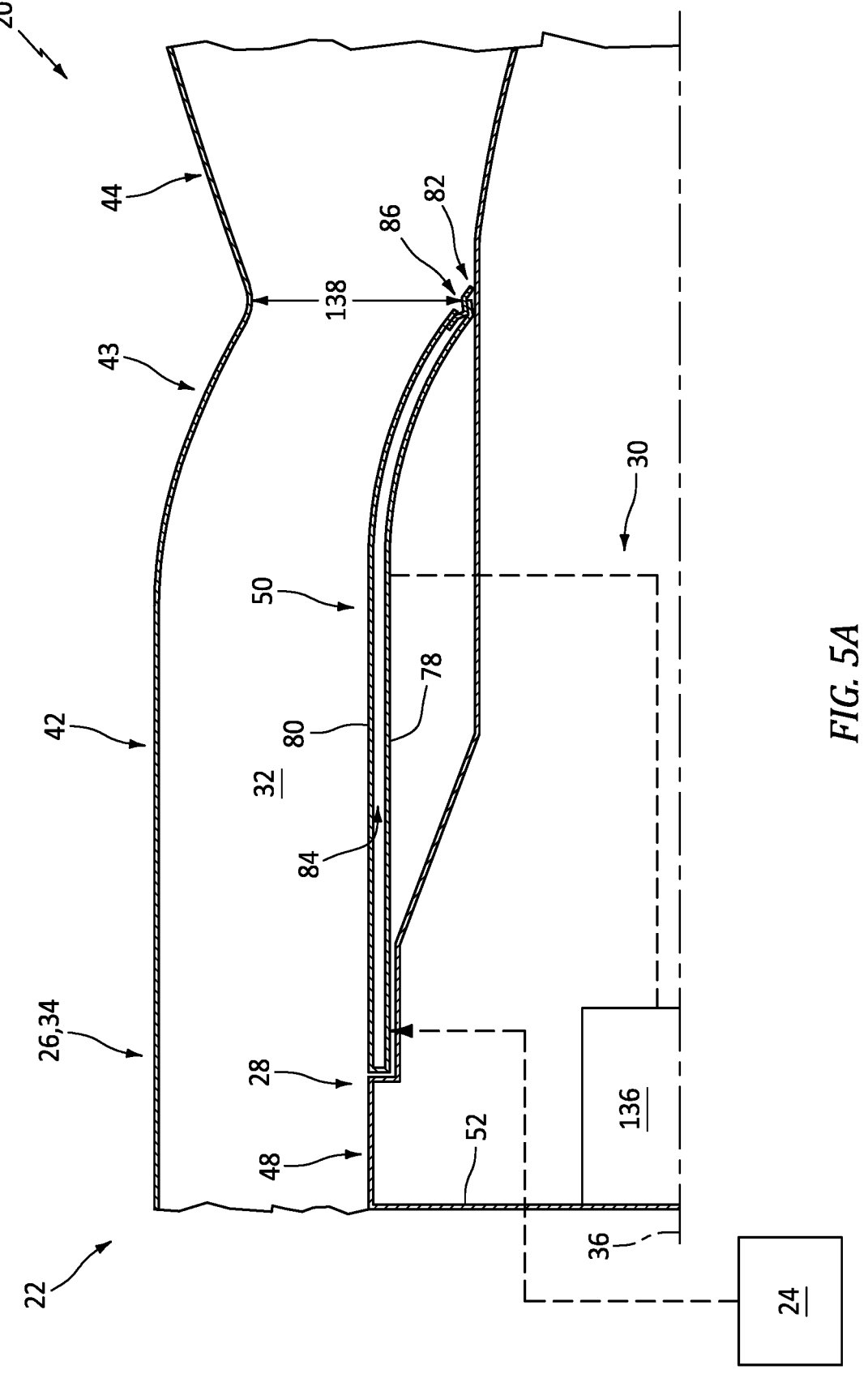
FIGS. 5A and 5B are partial side schematic illustrations of the nozzle system with its nozzle sleeve in various positions.
Figure 5B:
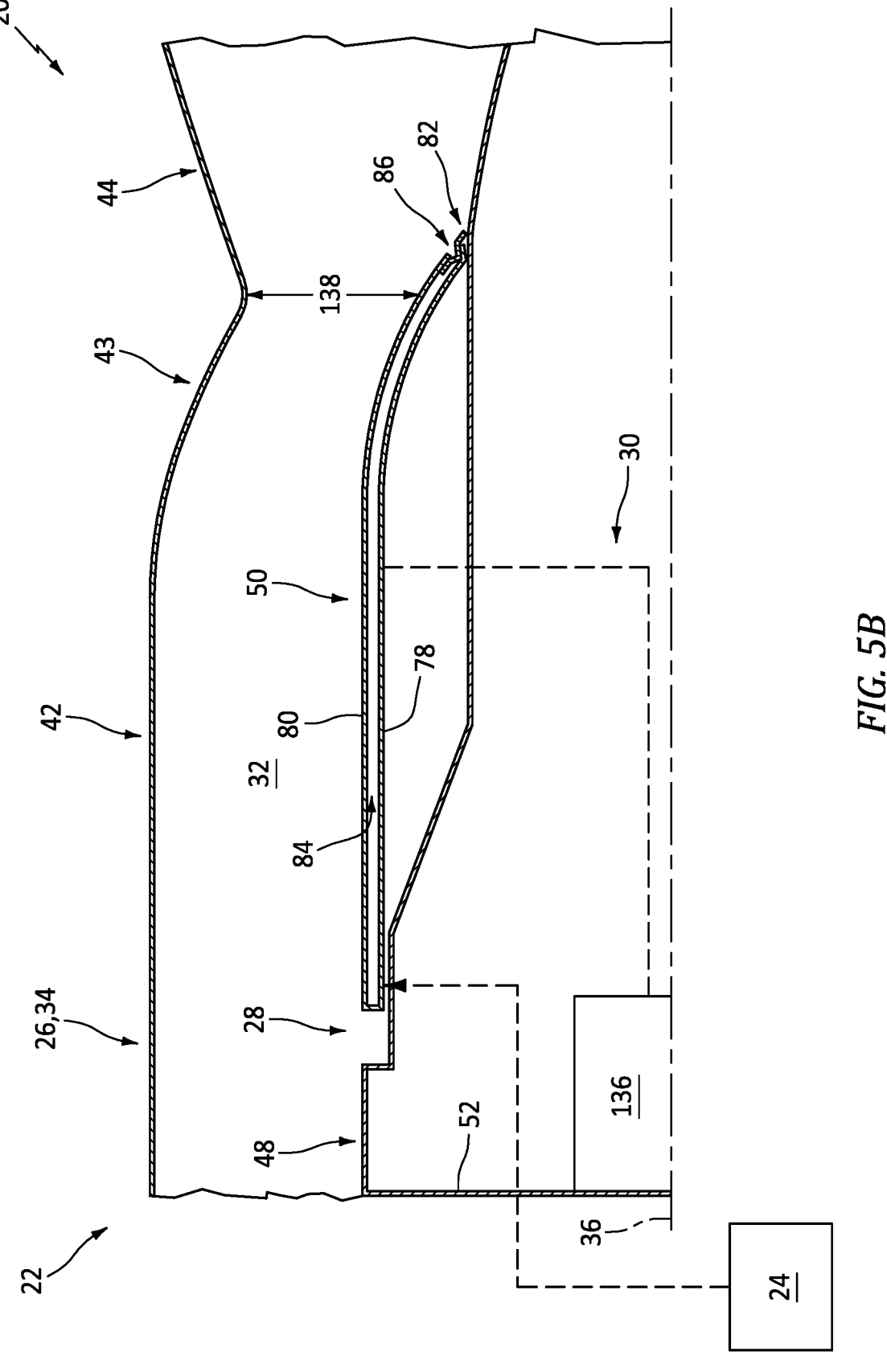

During operation, the actuation system 30 and its actuator 136 may move (e.g., translate) the nozzle sleeve 50 axially along the inner nozzle wall 48 between a first position (e.g., see FIG. 5A) and a second position (e.g., see FIG. 5B). For example, to move the nozzle sleeve 50 towards or to the first position of FIG. 5A, the actuator 136 may move (e.g., pull) the nozzle sleeve 50 axially towards the actuator mount 52 in a forward, upstream direction; e.g., right-to-left. In the first position of FIG. 5A, a choke point through the variable area nozzle 22 has a first cross-sectional area; e.g., see radial flowpath height 138. In another example, to move the nozzle sleeve 50 towards or to the second position of FIG. 5B, the actuator 136 may move (e.g., push) the nozzle sleeve 50 axially away from the actuator mount 52 in an aft, downstream direction; e.g., left-to-right. In the second position of FIG. 5B, the choke point through the variable area nozzle 22 has a second cross-sectional area (e.g., see radial flowpath height 138) which is different (e.g., less) than the first cross-sectional area. Thus, by moving the nozzle sleeve 50 axially somewhere between or to the first position or the second position, flow area through the variable area nozzle 22 may be selectively tailored.

Referring to FIG. 1, the cooling air source 24 is fluidly coupled to the cooling cavity 84. The cooling cavity 84 may thereby receive pressurized cooling air form the cooling air source 24. Depending on how and/or where the variable area nozzle 22 is implemented within the aircraft engine and/or the configuration of the cooling air source 24, a pressure of the cooling air within the cooling cavity 84 may be less than a pressure of combustion products flowing in the flowpath 32 along the nozzle sleeve 50 and its sleeve liner 80. The cooling air source 24, for example, may be configured as a bleed from a low pressure compressor (LPC) section of the aircraft engine, a ram air inlet or another relatively low pressure air source. With such a pressure differential between the cooling cavity 84 and the flowpath 32, typical cooling schemes (e.g., effusion cooling, film cooling, etc.) may be ineffective. Therefore, the apertures 132/the channel 134 of FIG. 3 may be configured as the only outlets from the cooling cavity 84 into the flowpath 32. For example, at least a portion of the sleeve liner 80 extending longitudinally along the cooling cavity 84 and upstream of the vacuum ejector 86 may be non-perforated; e.g., not include any type of cooling apertures. However, as the high pressure combustion products flows longitudinally across the channel 134, this flow of combustion products may generate a suction force and draw (e.g., siphon) the cooling air out of the cooling cavity 84 through the apertures 132 and the channel 134. The vacuum ejector 86 may thereby vacuum eject the cooling air from the cooling cavity 84 into the flowpath 32. Here, the flow of the cooling air through the cooling cavity 84 may convectively cool the sleeve liner 80. After the cooling air is directed into the flowpath 32, the cooling air may film cool the (e.g., single walled) sleeve tip 124 and a portion of the (e.g., single walled) inner nozzle wall 48 projecting aft and downstream from the nozzle sleeve 50.

For ease of description, the nozzle sleeve 50 is described above as including the single cooling cavity 84; e.g., an annular cooling cavity. It is contemplated, however, the nozzle sleeve 50 may alternatively be configured with multiple of the cooling cavities 84; e.g., arcuate cooling cavities. Here, the cooling cavities 84 may be arranged circumferentially about the axis 36 in an array; e.g., a circular array.

In some embodiments, the sleeve shell 78 and/or the sleeve wall 82 may be formed from a first material and the sleeve liner 80 may be formed from a second material. The first material may be different than the second material. The first material, for example, may be metal and the second material may be ceramic (e.g., ceramic matrix composite (CMC)) or a different type of metal. The present disclosure, however, is not limited to such an exemplary multi-material construction. For example, the first material may alternatively be the same as (or similar to) the second material; e.g., both materials may be a common type of metal. The inner nozzle wall 48 may also (or may not) be formed from the first material.

Figure 6:
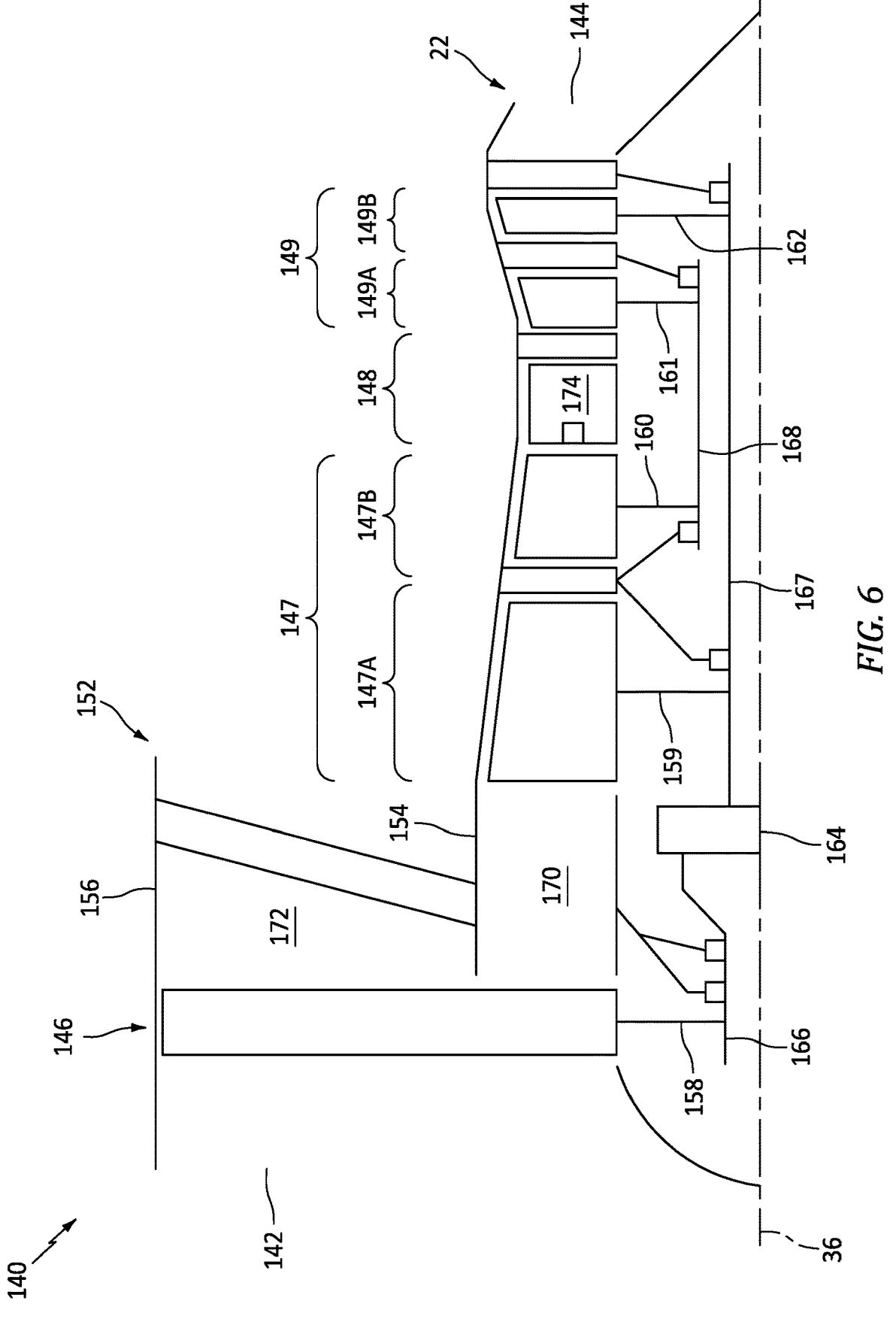
FIG. 6 is a partial side schematic illustration of a gas turbine engine which may include the nozzle system.

FIG. 6 illustrates the aircraft engine as a gas turbine engine 140; e.g., a turbofan engine. This turbine engine 140 extends axially along an axial centerline (e.g., the axis 36) between a forward, upstream airflow inlet 142 and an aft, downstream combustion products exhaust 144. The turbine engine 140 includes a fan section 146, a compressor section 147, a combustor section 148 and a turbine section 149. The compressor section 147 includes a low pressure compressor (LPC) section 147A and a high pressure compressor (HPC) section 147B. The turbine section 149 includes a high pressure turbine (HPT) section 149A and a low pressure turbine (LPT) section 149B.

The engine sections 146-149B are arranged sequentially along the axis 36 within an engine housing 152. This engine housing 152 includes an inner case 154 (e.g., a core case) and an outer case 156 (e.g., a fan case). The inner case 154 may house one or more of the engine sections 147A-149B; e.g., an engine core. The outer case 156 may house at least the fan section 146.

Each of the engine sections 146, 147A, 147B, 149A and 149B includes a respective bladed rotor 158-162. Each of these engine rotors 158-162 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 158 is connected to a geartrain 164, for example, through a fan shaft 166. The geartrain 164 and the LPC rotor 159 are connected to and driven by the LPT rotor 162 through a low speed shaft 167. The HPC rotor 160 is connected to and driven by the HPT rotor 161 through a high speed shaft 168.

During turbine engine operation, air enters the turbine engine 140 through the airflow inlet 142. This air is directed through the fan section 146 and into a core flowpath 170 (e.g., the flowpath 32) and a bypass flowpath 172. The core flowpath 170 extends sequentially through the engine sections 147A-149B; e.g., the engine core. The air within the core flowpath 170 may be referred to as "core air". The bypass flowpath 172 extends through a bypass duct, which bypasses the engine core. The air within the bypass flowpath 172 may be referred to as "bypass air".

The core air is compressed by the LPC rotor 159 and the HPC rotor 160 and directed into a (e.g., annular) combustion chamber 174 of a (e.g., annular) combustor in the combustor section 148. Fuel is injected into the combustion chamber 174 and mixed with the compressed core air to provide a fuel-air mixture. This fuel-air mixture is ignited and combustion products thereof flow through and sequentially drive rotation of the HPT rotor 161 and the LPT rotor 162. The rotation of the HPT rotor 161 and the LPT rotor 162 respectively drive rotation of the HPC rotor 160 and the LPC rotor 159 and, thus, compression of the air received from a core airflow inlet. The rotation of the LPT rotor 162 also drives rotation of the fan rotor 158. The rotation of the fan rotor 158 propels the bypass air through and out of the bypass flowpath 172. The propulsion of the bypass air may account for a majority of thrust generated by the turbine engine 140, e.g., more than seventy-five percent (75%) of engine thrust. The turbine engine 140 of the present disclosure, however, is not limited to the foregoing exemplary thrust ratio.

With the arrangement of FIG. 6, the variable area nozzle 22 may be arranged at and may form the combustion products exhaust 144. The present disclosure, however, is not limited to such an exemplary variable area nozzle arrangement along the core flowpath 170. With different types and configurations of aircraft engines, the variable area nozzle 22 may alternatively be arranged at other (e.g., more upstream) locations along the core flowpath 170. The present disclosure, therefore, is not limited to exhaust nozzle arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft engine, comprising:
a variable area nozzle including a nozzle wall, a nozzle sleeve, an actuation system and a flowpath extending axially along an axis through the variable area nozzle and radially between the nozzle wall and the nozzle sleeve;
the nozzle sleeve including a shell, a liner, a cooling cavity and an ejector, the shell extending axially along and circumferentially about the axis, the liner axially overlapping and circumscribing the shell, the cooling cavity formed by and radially between the shell and the liner, the ejector arranged at a downstream end of the liner along the flowpath, the ejector fluidly coupling the cooling cavity to the flowpath, the ejector comprising an ejector wall with an ejector aperture, the ejector wall extending radially between and connected to the shell and the liner, the ejector aperture located radially between the shell and the liner, and the ejector aperture extending through the ejector wall and fluidly coupling the cooling cavity to the flowpath; and
the actuation system configured to move the nozzle sleeve axially along the axis relative to the nozzle wall.

2. The apparatus of claim 1, wherein the ejector is configured to direct cooling air from the cooling cavity into the flowpath.

3. The apparatus of claim 1, further comprising:
a fluid source fluidly coupled to the cooling cavity;
the nozzle sleeve configured to receive cooling air in the cooling cavity from the fluid source at a pressure that is less than a pressure of combustion products flowing in the flowpath along the nozzle sleeve.

4. The apparatus of claim 1, wherein the liner is non-perforated along the cooling cavity upstream of the ejector.

5. The apparatus of claim 1, wherein a height of the cooling cavity decreases as the cooling cavity extends longitudinally within the nozzle sleeve to the ejector aperture.

6. The apparatus of claim 1, wherein
a channel projects into the nozzle sleeve from the flowpath to the ejector wall; and
the channel fluidly couples the ejector aperture to the flowpath.

7. The apparatus of claim 6, wherein the liner overlaps a portion of the channel and the aperture.

8. The apparatus of claim 1, wherein
the nozzle sleeve further includes a sleeve wall;
the sleeve wall comprises the ejector wall and connects the shell to the liner; and
the liner and the sleeve wall collectively form a radial inner peripheral boundary of the flowpath along the nozzle sleeve.

9. The apparatus of claim 1, wherein at least a section of the liner that extends to the downstream end of the liner has a frustoconical geometry.

10. The apparatus of claim 1, wherein a radius of an outer side of the nozzle sleeve decreases as the nozzle sleeve extends, in a downstream direction along the flowpath, axially along the axis to the downstream end of the liner.

11. The apparatus of claim 1, wherein
the nozzle wall is an outer nozzle wall, and the variable area nozzle further includes an inner nozzle wall extending axially along and circumscribing the axis; and
the nozzle sleeve axially overlaps and circumscribes the inner nozzle wall; and
the actuation system is configured to translate the nozzle sleeve axially along the inner nozzle wall.

12. The apparatus of claim 1, wherein the cooling cavity has a longitudinal length that is equal to or greater than two-thirds of a longitudinal length of the nozzle sleeve along the flowpath.

13. The apparatus of claim 1, wherein the variable area nozzle is configured as a convergent-divergent nozzle.

14. The apparatus of claim 1, wherein
the ejector wall contacts the shell at an inner radial end; and
the ejector wall contacts the liner at an outer radial end.

15. An apparatus for an aircraft engine, comprising:
a variable area nozzle including a nozzle wall, a nozzle sleeve, an actuator and a flowpath extending axially along an axis through the variable area nozzle and radially between the nozzle wall and the nozzle sleeve;
the nozzle sleeve including a shell, a liner, an endwall, a cooling cavity and an aperture, the shell extending axially along and circumferentially about the axis, the liner axially overlapping and circumscribing the shell, the endwall extending radially between and connected to the shell and the liner at a downstream end of the liner, an inner radial end of the endwall connected to and contacting the shell, an outer radial end of the endwall connected to and contacting the liner, the cooling cavity extending longitudinally within the nozzle sleeve to the endwall, the cooling cavity formed by and between the shell and the liner, and the aperture extending through the endwall and fluidly coupling the cooling cavity to the flowpath; and
the actuator operatively coupled to the nozzle sleeve and configured to move the nozzle sleeve axially along the axis relative to the nozzle wall.

16. The apparatus of claim 15, wherein
the endwall is angularly offset from the liner by a first included angle; and
the endwall is angularly offset from the shell by a second included angle which is greater than the first included angle.

17. The apparatus of claim 15, wherein the liner is angularly offset from the shell at the endwall by an acute included angle.

18. An apparatus for an aircraft engine, comprising:
a flowpath;

a structure forming a radial peripheral boundary of the flowpath, the structure including a shell, a liner, a cooling cavity and an ejector, the liner axially overlapping and circumscribing the shell, the cooling cavity between and formed by the shell and the liner, the cooling cavity extending longitudinally within the structure to the ejector, the ejector arranged at a downstream end of the liner along the flowpath, the ejector fluidly coupling the cooling cavity to the flowpath, the ejector comprising a liner mount, an endwall and a shell mount, the shell mount projecting out from an inner radial end of the endwall, the shell mount connected to and in contact with the shell, and the liner mount projecting out from an outer radial end of the endwall, and the liner mount connected to and in contact with the liner; and a fluid source fluidly coupled to the cooling cavity, the structure configured to receive cooling air in the cooling cavity from the fluid source at a pressure that is less than a pressure of combustion products flowing in the flowpath along the liner.

19. The apparatus of claim 18, wherein the structure is configured as part of a variable area nozzle.

20. The apparatus of claim 18, wherein the radial peripheral boundary of the flowpath is a radial inner peripheral boundary of the flowpath.

\* \* \* \* \*